Figure 1:
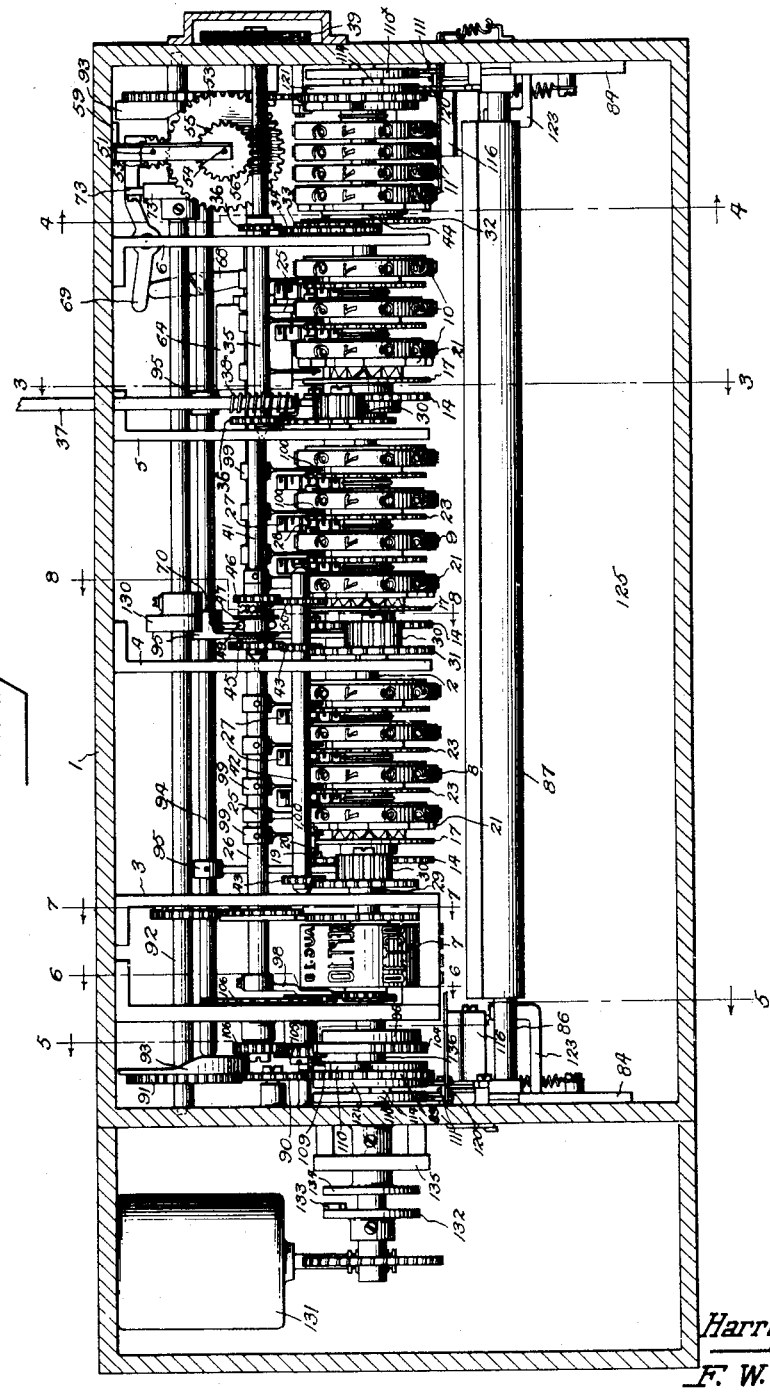

May 17, 1938. H. CLIFTON ET AL 2,117,653
METER ATTACHMENT
Filed June 30, 1931 6 Sheets-Sheet 1

Inventors
Harry Clifton
F. W. Whitehead
By
Attorney

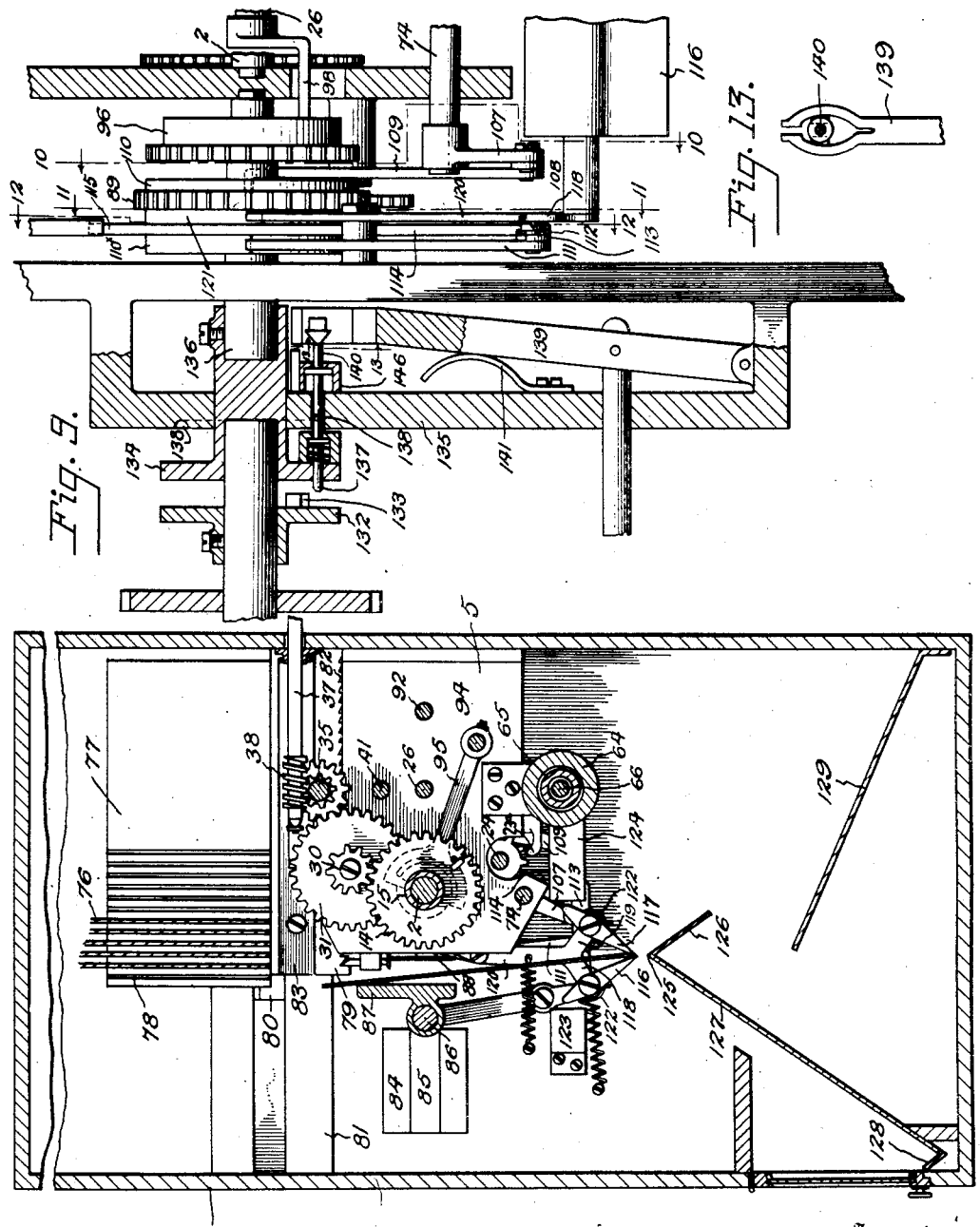

May 17, 1938.  H. CLIFTON ET AL  2,117,653
METER ATTACHMENT
Filed June 30, 1931   6 Sheets-Sheet 4

Inventors
Harry Clifton
F. W. Whitehead
By
Attorney

May 17, 1938.  H. CLIFTON ET AL  2,117,653
METER ATTACHMENT
Filed June 30, 1931  6 Sheets-Sheet 5
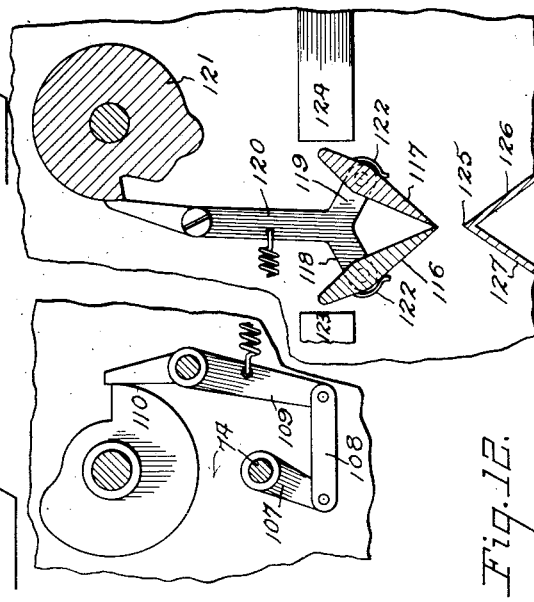
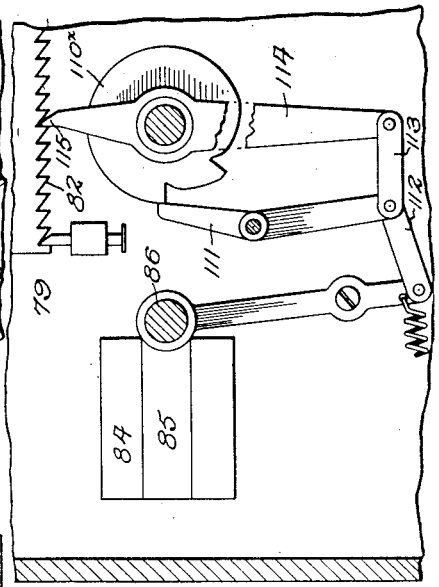
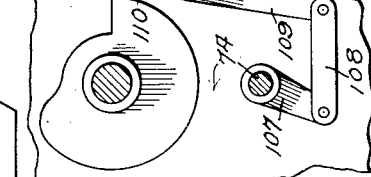
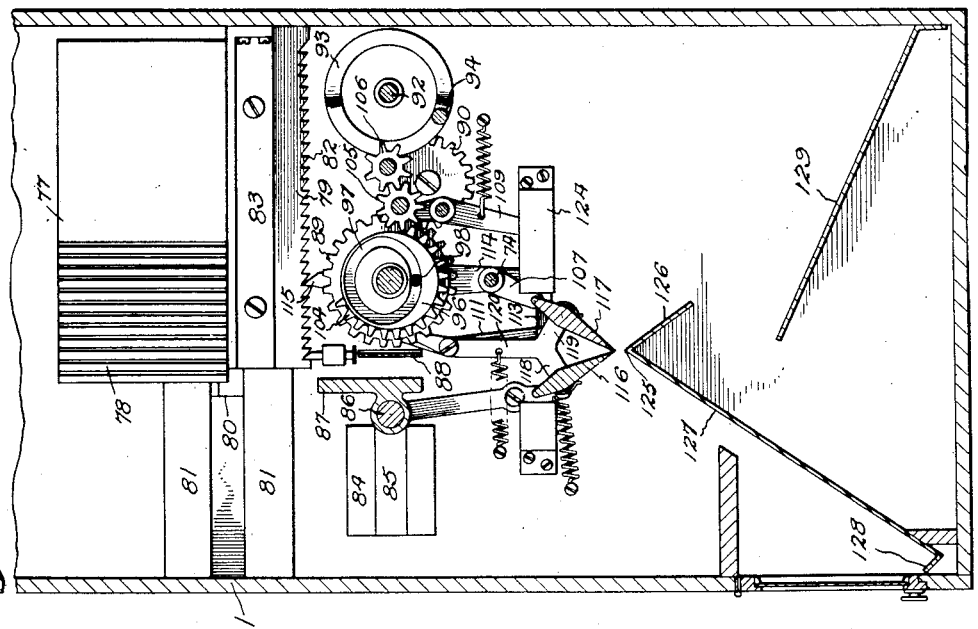
Inventors
Harry Clifton
F. W. Whitehead
By
Attorney May 17, 1938.  H. CLIFTON ET AL  2,117,653
METER ATTACHMENT
Filed June 30, 1931  6 Sheets-Sheet 6
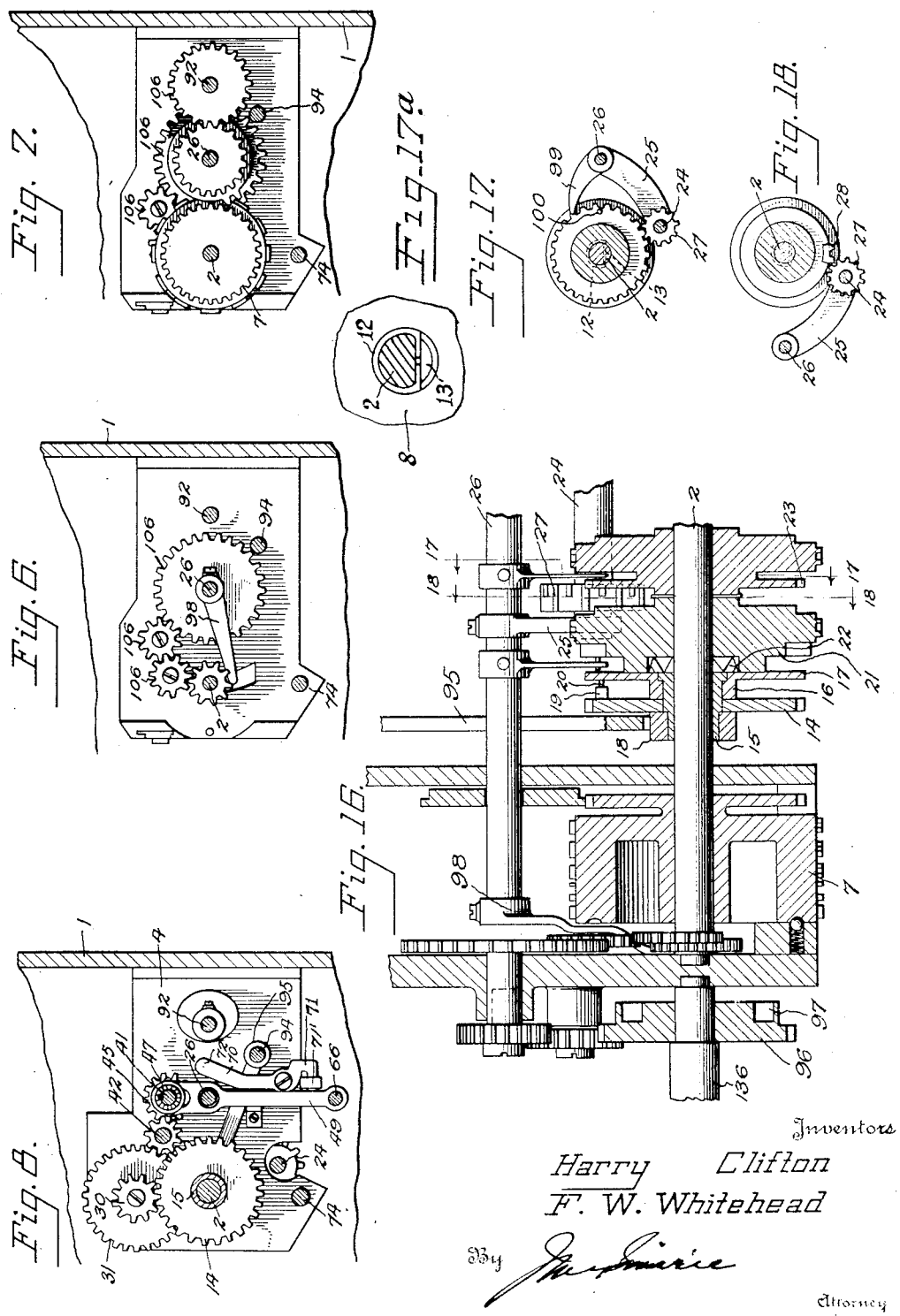
Inventors
Harry Clifton
F. W. Whitehead
By
Attorney Patented May 17, 1938

2,117,653

UNITED STATES PATENT OFFICE 2,117,653

METER ATTACHMENT

Harry Clifton and Frederick W. Whitehead, Erie, Pa., assignors to Whitecliff Development and Manufacturing Company, Erie, Pa., a corporation of Delaware Application June 30, 1931, Serial No. 547,996

8 Claims. (Cl. 234—58)

This invention is directed to a meter recording and registering mechanism combined with automatic printing means for legibly indicating the periodic results of the recorder and register.

In the use of meters, particularly in connection with city service utilities, each individual user is ordinarily supplied with a meter giving visible indication of the consumption of the particular commodity, the readings of which meters are taken at stated intervals by an employe of the service corporation, the readings of the meters allotted to his charge being turned in at the office and the bills for the service as indicated on each particular meter are made out and sent to the customer. As these meters ordinarily read progressively, a particular reading at any one period in order to indicate the consumption during that period is subject to deduction from the reading at the previous period in order first to indicate the actual consumption during the selected period and provide a means by which the service charge for that consumption may be made.

Furthermore, city service corporations ordinarily permit a definite reduction in the actual charge if the bill is paid within a certain period after rendition, and this reduction is ordinarily indicated on the bill as the actual net charge if the bill is promptly paid. These details, heretofore necessary with service meters, are a matter of considerable expense to the service corporations, to say nothing of the possibility of error in reading the meter or of loss in the mails in transmitting the bill, which, of course, necessitate additional work on the part of the corporation.

The present invention is designed with a view to overcoming these items of expense and annoyance to the service corporation, and to provide a mechanism which will entirely relieve the corporation of the necessity of inspecting the meters to determine the consumption and of making out bills for the particular customer based upon his meter-indicated consumption.

The invention, therefore, has for its primary object the provision of an attachment for meters in which the meter operation is automatically indicated and automatically printed at any selected periods and the printed form complete in all detail delivered to the customer, that is, delivered beyond the particular meter to be conveniently obtained by the customer and paid in the usual manner.

In connection with service utilities delivering electricity, it is generally customary to employ a sliding scale or rate, the current being charged for at a certain rate up to a certain consumption and following that charged for at a lesser rate in order that large users of electricity may pay an average rate somewhat less than the users of small amounts of electricity. Calculations as to this sliding service charge are made at the office of the corporation following the reading of the meter, which constitutes an additional computation and adds to the labor and expense of rendering a bill to the consumer. Any recording attachment for use with meters to be of service must automatically take care of the changing rate referred to, as otherwise no proper indication on the bill rendered by the mechanism would be had.

The present invention, therefore, additionally provides for a change in recording rate in the mechanism following any selected service consumption to insure that the user if, by reason of the large consumption of current is entitled to the reduced rate for a portion of such consumption, may have the bill presented to him as a result of the operation of the mechanism absolutely correct in this particular.

A further object of the invention is the provision of means in mechanism of this character which not only provides for the automatic change of the recording mechanism in accordance with a sliding scale of charge but permits the mechanism to be set for any sliding rate occurring at any period in the service consumption and insuring the absolute accuracy of the sliding rate as finally printed upon the bill.

In connection with the usual bill rendered for electrical consumption, it is customary to indicate the number of kilowatts used for the particular period, the gross cost of the service predicated upon the kilowatts used and the net cost of such service, these matters being ordinarily calculated from the meter readings turned in by the employe following personal inspection of the particular meter.

In order to present a proper bill to the customer, it is essential that these items appear thereon, and furthermore the bill so rendered should not only be dated on the day of rendition but should bear a number peculiar to itself and to the meter with which it is associated in order to furnish proper identification of the particular bill with the particular meter, but such bill should also be printed in duplicate, one for the customer to be delivered beyond the attachment or meter, and the other for the service corporation to be retained within the meter or attachment subject to periodic withdrawal by the employe of the company.

A further object of the invention is the provision of a recording attachment for meters which, incident to its recording and printing operation, delivers to the customer and for the use of the company separate bills, on each of which appear the total consumption since the installation of the meter, the number of kilowatts or other units of measure consumed during the particular period from which the bill is rendered, the gross cost of such service, the net cost of such service, a date either on which the bill is rendered or on which it is due in order to take advantage of the net cost, and the serial number peculiar to that particular meter. Thus the bill delivered by the mechanism bears all necessary details in order to advise the customer as to all facts concerning past and present consumption and charges therefor in actual currency indications.

In order that the recording attachment may be serviceable for indicating the service consumption for a particular period and to complete this indication by rendering a bill for such service at the end of that period, it is apparent that following the completion of the recording for that period and the rendition of the bill, the recording apparatus must be reset to the zero or starting position in regard to certain particulars of such recording in order that each service period may be recorded independently of any other service period.

Therefore, a further object of the invention is the provision of means in which the recording mechanism, following the final or printing operation of such mechanism, is automatically reset in certain recording particulars to a zero or starting position, in order that each periodic operation of the mechanism may be independent of any other periodic operation and not accumulated with respect thereto, as in the ordinary meter register.

A further object of the present invention is the provision of mechanism of this type in which the recording operation, including the changed rate or sliding rate control, is automatically carried out by the operation of the meter per se; the delivery of the cards or bills for printing, the printing operation and the resetting of the recording mechanism to initial or starting point, being selectively carried out through the instrumentality of an independent organization which may be controlled at will from a remote point, such as the office of the corporation, for a series of meters within a particular section, or selectively inaugurated by an authorized employe of the corporation at the particular meter, it being understood that this independent actuating organization for the printing operation, delivery of the bills, and the resetting of the recorder may be set in operation at any desired interval following use of the meter, thus providing for the periodic delivery to the customer of proper bills at stated periods or the delivery to the customer of a bill at any particular period. This provision is designed in order to insure that the bills may be rendered at regular intervals during the use of the meter or may be rendered at any time in the event the use of the meter is discontinued between regular intervals or periods.

The invention is illustrated in the accompanying drawings, wherein:—

Figure 2:
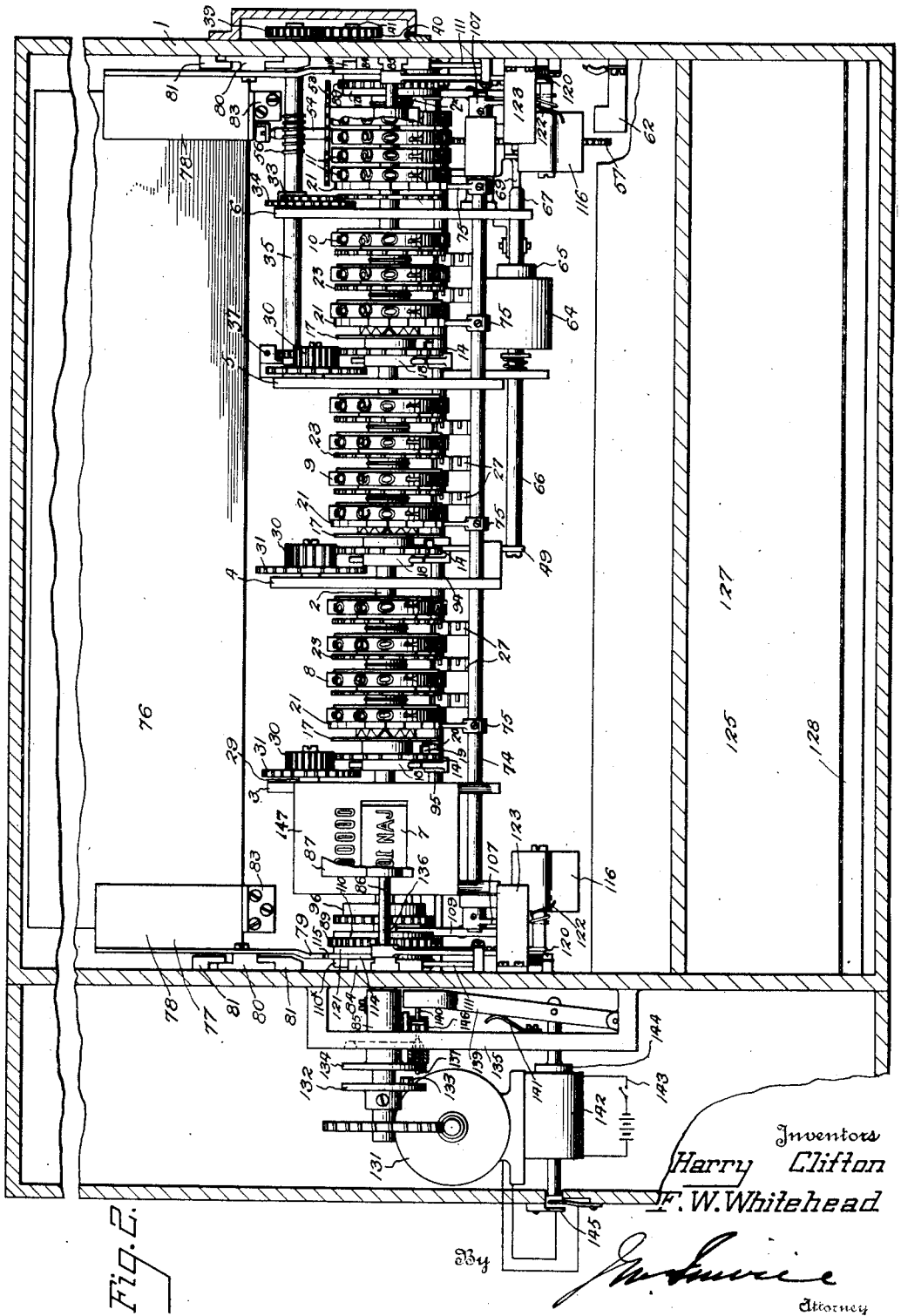
Figures 9, 14, 15:
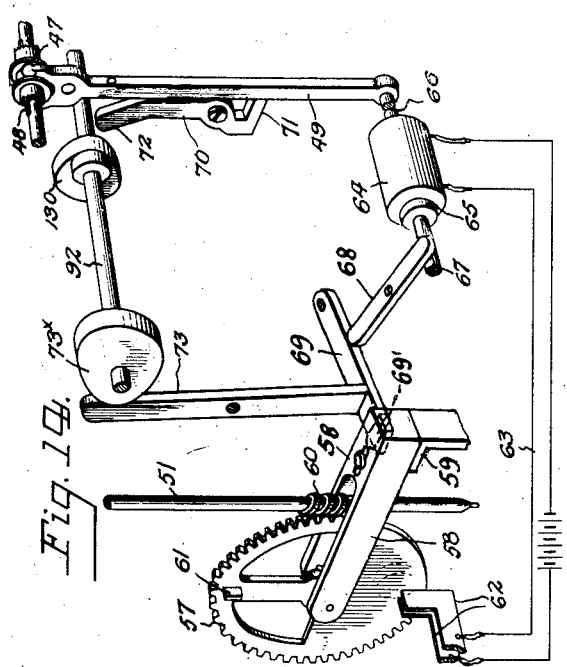

Figure 1 is a plan view with parts in section.
Figure 2 is a front elevation with parts in section.
Figure 3 is a section on line 3—3 of Figure 1.
Figure 4 is a section on line 4—4 of Figure 1.
Figure 5 is a section on line 5—5 of Figure 1.
Figure 6 is a section on line 6—6 of Figure 1.
Figure 7 is a section on line 7—7 of Figure 1.
Figure 8 is a section on line 8—8 of Figure 1.
Figure 9 is an enlarged elevation of the control means with the connected parts, certain portions of the figure being shown in section.
Figure 10 is a section on line 10—10 of Figure 9.
Figure 11 is a section on line 11—11 of Figure 9.
Figure 12 is a section on line 12—12 of Figure 9.
Figure 13 is a section on line 13—13 of Figure 9.
Figure 14 is a perspective view showing the change rate control.
Figure 15 is a broken plan view of a portion of the change rate control means.
Figure 16 is a broken horizontal sectional view, partly in elevation, showing means for controlling the printing wheels.
Figure 17 is a section on line 17—17 of Figure 16.
Figure 17a is an enlarged view of a detail shown in Fig. 17.
Figure 18 is a section on line 18—18 of Figure 16.

The invention as illustrated is shown for use in connection with an electric meter, that is, a meter for measuring the consumption of electric current, and it is understood in this connection that while the showing is designed to illustrate this particular use of the attachment and that in such showing the necessary operating parts to carry out a proper conventional billing of the use of the electric current form a necessary part of the attachment illustrated, the attachment, when designed for other metering uses, is to be designed with particular respect to its tabulating elements for that particular use, and in such other use or uses may or may not include all the devices deemed necessary for the proper use of the attachment in connection with a meter for the electric current.

In designing the attachment for use with meters for electric current, the requisites of the bill, which is the ultimate purpose of the attachment as designed, require a recording of certain specific details which may be generally indicated as follows:—

In the first place, the bill, and therefore the printing mechanism of the attachment, must indicate the total kilowatts used since the installation of the meter, the total number of kilowatts used since the period of the last bill rendition, the gross cost of such kilowatts, the net cost to the consumer if the bill is paid within a prescribed period after rendition, the serial number of the particular meter in order that a particular bill may be associated with the meter and that meter alone, and a date, either on which the bill is rendered or giving the last day at which the net cost may be paid, that is, the last discount day. These various information details are to be printed on the bill to be rendered and, therefore, in the necessary details the mechanism must be adapted to produce these indications.

In the use of the attachment with other meters, that is, meters for other commodities, it is, of course, to be understood that the printing means will be arranged to suit the requirements of the bill for the particular service and that the details of the attachment to be described are to be duplicated or subtracted from, as may be desirable, to adapt the attachment for the printing of the information necessary with the particular meter.

In designing the attachment for use with electric meters, there are certain requirements peculiarly incident to the servicing of this commodity which must be taken care of. In the first place, the meter must show the total number of kilowatts used for the period for which the particular bill is being rendered and the printing mechanism defining this showing must be operated during the operation of the meter per se. The printing mechanism of the attachment must also show the cost of the used kilowatts at the price determined upon by the service corporation, and as it is universal that such service corporations allow a discount from such cost if the bill is paid within a certain period after rendition, the printing mechanism must also show in figures the cost to the consumer if the discount is taken advantage of. As the attachment is operated directly from the meter, it is apparent that all printing mechanisms must be simultaneously operated and that, therefore, the printing mechanism showing the net cost must be operated at a proportionally less speed than the printing mechanism showing the gross cost.

Furthermore, in the metering of the electric current, it is practically universal for the service corporation to charge a fixed rate for the initial use of the current up to a certain point and a very much reduced rate for the use of the current following this prescribed limit. Therefore, the attachment must be designed to take care of this changed rate condition and must be so designed that the change of rate can automatically take place following any predetermined current consumption at the higher rate, with the changed rate in proportion to the greater charge. The attachment must be completely flexible in this particular in order to meet the rules of the service corporation in this respect and yet must maintain the same ratio of discount between the changed rate gross cost and net cost as between the original rate gross cost and net cost.

The attachment will be described as an accessory to be connected to a conventional meter, it being understood, however, that it may be built into the meter proper in new installations and, therefore, become in effect an integral part of the meter construction.

The mechanism is here shown as an attachment and no attempt is made to illustrate or describe any part of the meter proper, though the description is to be understood as contemplating its unitary arrangement with the meter proper if desired.

The improvement contemplates the use of a casing, indicated generally at 1, which if the device is used as an attachment will be additional to the usual meter casing, and where the device is used as an integral part of the meter will be formed in effect by the meter casing. This attachment casing 1 includes certain detailed elements which will be specifically referred to as the description proceeds.

The main operating shaft 2 is mounted for free rotation in bearings in one end wall of the casing passing in transit through partitions 3, 4 and 5 and mounted in partitions 6. Mounted loosely on the shaft in advance of the partition 3 is a dating wheel 7 designed to be intermittently operated, as later described, and bearing on its face printing indicia indicating, for example, the date on which the discount period for the particular bill ends. Mounted freely upon the shaft between the partitions 3 and 4 is a plurality of printing disks or wheels 8 which together constitute the net cost recorder.

Mounted freely upon the shaft 2 between the partitions 4 and 5 is a series of printing wheels 9 arranged to record the gross cost recording for the service. The sets of wheels 8 and 9 are here shown as four in number, which will provide for a cost indication of $99.99 at a maximum, though it is to be understood that the appropriate number of wheels necessary for the limit to which the recorder is designed to indicate may be used.

Mounted freely upon the shaft 2 between the partitions 5 and 6 is a plurality of printing wheels arranged to record the total kilowatt consumption for the period for which the particular bill is being rendered, and mounted for free movement on a stub shaft $2x$ projecting from the partition 6 (Figure 2) are a series of printing wheels 11 grouped to operate in a conventional manner as a totalizer and serving to record the total consumption regardless of the billing periods. With respect to the mounting of these various printing wheels, it is to be understood that the respective printing wheels must turn independently on the shaft in the setting up operation, while there must be sufficient frictional cooperation between the shaft and hub of each of the wheels to permit the rotation of the shaft in the proper direction to reset the wheels following the operation of the attachment. This frictional cooperation between the shaft and hub of each of the printing wheels is not illustrated but any conventional means well known in this art is contemplated for the purpose.

To maintain the printing wheels in spaced relation and prevent frictional contact between the wheels, a spring 12 (Figure 17) is preferably arranged in the hub of each wheel, with the spring including a circular portion bearing against the hub preferably seating in a groove in the hub, and a transverse straight portion 13 seating in a groove in the shaft. The springs do not interfere with the comparatively free rotation of the printing wheels but assist in holding the wheels in proper position on the shaft to avoid frictional contact therebetween.

It is, of course, apparent that the printing wheels which record the net cost, as 8, the gross cost, as 9, and the total kilowatts for the period since the rendition of the last bill, as 10, require to be reset to a zero position after the printing of a particular bill in order to record the desired facts for the next bill. Therefore, these printing wheels 8, 9 and 10 must be capable of being disconnected from their operative driving mechanism to permit of a reverse or resetting operation. To provide for this, as more particularly illustrated in Figure 16, there is arranged a clutch between the driving mechanism responsive to meter action and the initial printing wheel of each set of the wheels 8, 9 and 10. This clutch includes a gear 14 having an elongated hub 15 loosely mounted on the shaft 2. On the hub 15 at one side of the gear is mounted the hub 16 of the clutch disk 17, the free edge of the hub 15 of the gear having an edge extension fitting into a channel in the hub 16 of the clutch disk so that the clutch disk and gear are permitted independent rotative movement but held against relative axial movement.

On the gear hub 15 beyond the gear in opposition to the clutch disk is fixed a filler block 18. The gear communicates movement to the clutch disk by a lateral pin 19 on the gear engaging a similar pin 20 on the disk so that in the rotation of the gear the disk will be driven in the clockwise direction, while at the same time, for a reason which will later appear, the clutch disk may be advanced in the same direction without interference from and independently of the gear. That face of the initial printing wheel of the respective series referred to next the clutch disk has secured thereto a stepped or pawl disk 21, the teeth of which are pronounced and relatively large and the purpose of which is to serve as a connection with means to be described for insuring the positioning of the initial wheel in printing relation, that is, with one of the numerals or characters on such wheel in the printing line, which positioning, in addition to providing time for permitting actuation of the operating mechanism, insures that the initial wheel will make a printing record notwithstanding the fact that at the particular time of taking the record the actual operation of the initial printing wheel may be in a non-printing position with respect to the proper alignment of its numerals. The proximate faces of the clutch disk 17 and pawl disk 21 are formed with clutch teeth 22 whereby, when the teeth are in cooperation, the initial printing wheel is operated in the actuation of the clutch disk 17 and free of such actuation when the clutch teeth are separated.

Proper and relative stepping up movement of the successive printing wheels of each series is secured by providing each wheel other than the initial wheel with a gear 23, and mounted on a shaft 24 supported in rocker arms 25 fixed to a shaft 26 loosely mounted in the partitions 3, 4 and 5 is a mutilated pinion 27 for cooperation with the gear 23. The alternate teeth of the pinion 27 are approximately one-fourth the axial width of the pinion, the relation between adjacent full width teeth providing an area in which the rim of the immediately preceding printing wheel 8 rides during the operation of that wheel to thus hold the pinion against rotation. A toothed lug 28 is arranged on the face of each printing wheel other than the final one of the set, which toothed lug, as the particular printing wheel reaches the final or limit number on its periphery, rides into cooperation with a short width tooth on the adjacent mutilated pinion 27, and in the next step up movement of the particular printing wheel, this toothed lug operates the mutilated pinion and advances that pinion one tooth.

This movement of the pinion is transmitted through the gear 23 to the printing wheel to which that gear is connected, thus advancing that particular printing wheel the distance of one numeral. This is a conventional step up mechanism and provides for the proper tabulating movement of the wheels of each series without regard, of course, to the number of such wheels. The important element in this particular connection is that the mutilated gears are mounted through the medium of the rocker arms 25 on a shaft 26 adapted for rotary oscillation in order that the mutilated gears may be moved out of transfer relation to the printing wheels in order to provide for a resetting of the wheels, as will later appear.

When the transfer wheels are moved out of meshing position so as to free the printing wheels, the teeth of such transfer wheels engage an appropriately shaped bar 23a supported on the partitions, which engagement serves to prevent the transfer wheels from turning while in inoperative position and insures their return to operative position in such relation as to compel a proper meshing of the wheels. This is illustrated more particularly in Figure 3.

As previously stated, the series of printing wheels 9 indicate gross cost, while the series of printing wheels 8 indicate the net cost. Obviously, therefore, the rotation of the printing wheels 8 must be proportionally less in the same time period than the rotation of the printing wheels 9. A stub shaft 29 is supported in each of the partitions 3, 4 and 5, on which is mounted a barrel pinion 30 having a relatively fixed end gear 31. The barrel pinion is in constant mesh with the gear 14 forming part of the clutch, the connection, owing to the provision of the barrel pinion, being maintained even when the clutch is disconnected. Through a proper proportioning of the gear 14, barrel pinion 30 and end gear 31 of the net cost printing wheels and the gear 14 barrel pinion 30 and end gear 31 of the gross cost printing wheels, it is apparent that the net cost printing wheels may be driven constantly in the operation of the mechanism but at a somewhat less speed than the gross cost printing wheels so that the ultimate position of the net cost printing wheels record a less amount than the gross cost printing wheels. The relative proportions between these respective driving elements is, of course, merely a matter of the proper number of teeth in the respective gears and pinions, and it is to be understood that these relations are such that the net cost printing wheels will indicate a cost reduced in proportion according to the discount permitted by the particular service corporation when bills are paid within a certain time after rendition. This mathematical variation in the driving means is incident only to the net cost printing wheels 8, as the gross cost printing wheels 9 and total period printing wheels 10 are operated for printing purposes at the same speed, as will be evident.

The totalizer printing wheels require no resetting, hence the clutch is eliminated and the totalizer is provided with a gear 32 connected to the initial totalizer wheel operated through a pinion 33 carried on the stub shaft and having connected therewith a drive gear 34 corresponding to the drive gears or end gears 31 of the other printing wheels. The totalizer printing wheels are stepped up in any usual or preferred manner, as this detail forms no particular part of the present invention.

The attachment illustrated and described for the purpose of disclosing this invention is shown for use in connection with an electric meter. It is well known that in selling the electric current, it is usual for the service corporation to materially reduce the charge per unit of such current after the use of a certain number of units. For example, the charge for the first fifty units will be, say ten cents per unit, while the units consumed after the initial fifty units are charged for at a very much reduced rate, say five cents a unit. Where this condition prevails it is apparent that the detachment must be designed for this changed rate and this changed rate provision must be automatically taken care of by the attachment itself in order that where the attachment has recorded the permissible number of units at the high rate, all units used following such permissible number must be charged for at a different rate. The attachment, to be of commercial utility, must provide for this changed rate and the provision must be an automatic one controlled entirely by the attachment.

This changed rate condition leads to another problem in connection with an attachment of this type, and that is if the attachment has automatically changed the rate and a bill has been rendered for the particular period, the attachment, when reset for recording for the next period, must be automatically restored to the initial or high rate. A further essential provision for this particular purpose is incident to the fact that the changed rate is indicated only on the net cost printing wheels and the gross cost printing wheels, as such changed rate necessarily does not affect either the total period printing wheels or the totalizer. Obviously, therefore, distinct provisions for operating these respective sets of printing wheels must be arranged.

The attachment, therefore, involves a drive shaft 35 rotatably supported in partitions 5 and 6 and in the end wall of the casing, this shaft terminating in the partition 5. The shaft 35 is provided with pinions 36 and is operated by a power shaft 37 driven directly from the meter and having a worm and gear connection at 38 with the shaft 35. Immediately beyond one wall of the casing 1 the drive shaft 35 is provided with a gear 39 cooperating with a similar sized gear 40 secured upon the end of a shaft 41 which extends longitudinally of the attachment and is terminally mounted in a partition 4. An intermediate shaft 42 is supported in the partitions 3 and 4 and is provided with pinions 43 and 43' to mesh respectively with the end gears 31 and 31' of the gross and net cost printing wheels, the totalizer printing wheels being driven by intermediate gears 44.

The changed rate affects, of course, only the net cost and gross cost printing wheels. That is to say, these printing wheels are changed in their rotational speed without changing the speed of the other printing wheels or of the other mechanism of the attachment in order to show a reduced cost following the proper interval of operation at the higher or increased cost. In order to secure this result, the ratio of the gear connection between the shafts 41 and 42 is automatically changed by the attachment, the change in operating speed being secured by providing on the shaft 41 for operating the gross cost printing wheels 9, spaced gears 45 and 46 loose on the shaft and held against longitudinal movement thereon and connected at will to the shaft through an intermediate clutch 47 keyed on the shaft at 48 and actuated through a clutch arm 49. The gear 45 is in mesh with the gear 43 for actuating the gross cost indicator through the end gear 31, while the gear 46 is in constant mesh with an additional gear 50 on shaft 42. The relative driving ratio between the gears 45 and 43 on the one hand, and through the gears 46 and 50 as a driving means for the gear 43 on the other hand is such that through this drive the speed of the gross cost and net cost tabulating wheels is varied in accordance with the rate change. Thus, if the clutch is in cooperation with the gear 45 and thereby fixes this gear with respect to the shaft 41, the shaft 42 is operated through the gear 43 and the gross and net cost printing wheels are driven at what would be termed the high or normal cost, whereas if the clutch is in position to fix the gear 46 to the shaft 41, the drive of the shaft 42 is through this gear 46 and the additional gear 50, which reduces the speed of the shaft 42 and thereby the speed of the operation of the gross and net cost tabulating wheels to reduce the cost indication in accordance with the permissible reduction. Of course, the rate of change in the cost is determined entirely by the relative sizes of the gears and these gears are contemplated to be in proper relative proportions to accomplish the changed rate according to the practice of the service corporation using the attachment.

The clutch arm 49 must be shifted automatically following an operation of that number of units for which a normal or high cost rate is made so that all registering of additional units may be recorded at the changed rate of less cost. To provide for this automatic change, that is, operation of the clutch arm 49 at a predetermined period, a shaft 51 is supported in hanger bearings in the casing and driven through a pinion 52 on such shaft meshing with a gear 53 on an appropriately supported stub shaft 54, which shaft carries a worm gear 55 driven from a worm 56 on the drive shaft 35. A change rate control gear 57 is rotatably supported in a hanger 58 mounted for sliding movement with respect to a bracket 59 carried by the appropriate wall of the casing. The changed rate control gear 57 is in the form of a worm gear driven from a worm 60 on shaft 51.

A circuit closing projection 61 is carried by the gear 57 and adapted, following a predetermined movement of this gear, to close a local circuit involving spring terminals 62 brought into contact when one of said terminals is engaged by the projection 61 and conductors 63 leading to a solenoid 64, the core 65 of which is extended as a rod 66 which is directly connected by an appropriately loose connection to permit variation in motion with the clutch arm 49. Of course, it is to be understood that the changed rate control gear 57 is operated at such speed through the gearing provided that the local circuit is not closed until the printing wheels controlled have registered the unit consumption charged for at the ordinary cost, and as the period at which this may occur is merely a matter of adjusting the gearing ratio, it will be apparent that the operation of the clutch arm 49 and thereby the driving of the net and gross cost printing wheels at the reduced speed provided for in the changed rate may in a simple manner by variation in gear ratio take place following any predetermined normal cost operation of the attachment.

A rod 67 projects from the solenoid in opposition to the rod 66 and is connected through a pin and slot connection to a lever 68 pivotally supported upon an appropriate portion of the casing 1, with the free end of the lever bearing against one edge of a trip arm 69 pivotally supported on the casing. The opposite end of the trip arm is seated in a recess 69' in the hanger 58, which hanger carries the change rate control gear 57. Thus, as the solenoid is operated, the clutch arm 49 is shifted and at the same time the trip arm 69 is moved by the lever 68 so as to move the change rate control gear 57 out of engagement with the worm 60. The change rate control gear is then returned to normal position preferably through an overbalancing of such gear, as by cutting out certain portions thereof, as indicated in Figure 14 of the drawings. This return of the gear 57 to normal position causes the circuit closing projection 61 to move to the uppermost position, as indicated in Figure 14, so that the contact 62 maintains the solenoid circuit open and the further operation of the gross cost and net cost printing wheels is at the reduced speed.

It is to be noted, however, that even at this reduced speed the ratio of cost between the gross cost and net cost is maintained, for the gear ratio controlling this variation is not in any way changed relatively by this changed rate control. The clutch arm 49 is preferably, through the use of a separate spring, normally influenced to move to a position of normal or high cost, that is, with the clutch in clutching cooperation with the pinion 45. The movement of the changed rate control gear to a position to close the circuit described causes the solenoid to move the clutch into clutching cooperation with the gear 46 to thereby lower the cost of the succeeding units used. Obviously, this condition of the clutch must be maintained during the subsequent operation of the mechanism throughout the rest of the period for which the bill is to be rendered, and as the clutch arm is normally influenced toward the gear 45, the clutch arm, when moved into cooperation with the gear 46, must be locked in that position until the next bill has been rendered and the parts restored to normal position for another operation.

To provide for this result, there is mounted adjacent the clutch arm a locking lever 70 pivotally supported on an appropriate part of the casing and having a depending locking terminal 71 which normally rests upon the upper edge of the clutch arm, as indicated in Figure 8. As the clutch arm is shifted through the energization of the solenoid, the locking terminal drops behind the clutch arm influenced by the weighted end 71' and so holds it in shifted position. The opposite end of the locking lever is projected as a trip member 72 to be actuated to release the clutch arm when the mechanism is reset, as will later appear.

The changed rate is thus automatically carried out by the attachment at a predetermined point in the operation, and this changed rate is maintained for the subsequent actuation of the attachment until it is reset. It will, of course, be apparent from the above description that during the operation of the mechanism during the recording of the units for which the normal or high charge is made, the changed rate control gear 57 is being continually operated toward a position where it will automatically change the rate, as previously described. It is apparent, however, in the use of the attachment with meters it will not infrequently happen, and probably will occur in the greater number of instances, that the current consumption during the period for which the bill is rendered will not reach that maximum to provide for a changed rate, that is, the consumer will not use sufficient current to be entitled to the benefit of the changed rate cost. However, during all this initial operation of the attachment, the changed rate control gear is being moved toward a position in which it will automatically effect a change in the rate. Of course, until it reaches this changed rate position, the solenoid will not be operated, the clutch arm 49 will not be actuated, nor the trip arm 69 moved to permit the changed rate control gear to return to normal position.

However, if under these circumstances the period is completed and the bill has been rendered, the attachment must be restored to normal or starting position and, therefore, means other than that described must be provided for permitting the changed rate control gear to return to normal position, for otherwise the next operation of the attachment would compel a changed rate at a very much less period of current consumption than permitted by the regulations of the service corporation.

To provide for this resetting of the changed rate control gear 57 notwithstanding the fact that it has not reached a changed rate position, the hanger 58 carrying the gear 57 is provided with an additional trip arm 73 which is pivotally supported on a lug projecting from the attachment casing and which lies in the path of a cam 73x of the control mechanism to be later described. The trip arm 73 depends below its pivot and bears against the edge of the trip arm 69 which obviously through operation of the cam 73x moves the trip arm and thereby the hanger 58 to cause cooperation of the gear 57 and worm 60. This trip arm 73 will thereby positively serve to restore the changed rate control gear to a normal or initial position notwithstanding the fact that it may not have reached a changed rate control position incident to the current consumption during the particular billing period.

The change rate mechanism, that is the necessary parts to effect a change in rate from a gross to a net cost, includes the shaft 51, the worm 60, the gear wheel 57, the circuit closer member 61, contact 62, circuit 63, solenoid 64, armature shaft 66, arm 49, clutch 47, shafts 41 and 42, and gears 43, 45, 46 and 50.

The tabulating mechanism is designed, of course, to serve as a recorder, in that the results are to be printed upon a bill or card as the final operation of the attachment at the end of a particular period. As the initial printing wheel of the various sets is being constantly moved during the operation of the meter, it follows that such initial printing wheel would not infrequently be in a position when the printing operation takes place with the particular number thereon out of the printing line, that is, such printing wheel, so far as the printing line is concerned, would be in a position intermediate adjacent numerals thereon if means were not provided to avoid such a condition.

In order to overcome this possibility, the initial wheel of each set is, by the control mechanism to be described, moved automatically so that a particular numeral thereon is in the printing line. Of course, this stepping up of this wheel is not the result of current consumption and it would appear, therefore, that the consumer is paying for current not consumed. However, it is to be remembered that the clutch disk 17 is operated by the gear 14 through the contact of pins 19 and 20 on these respective parts. Therefore, as the initial printing wheel is automatically stepped up as described, the pin 20 on the clutch disk 17, the clutch being still in cooperation, is moved away from the following pin 19 on the gear 14. Therefore, after the stepping up operation and the printing of the bill, the subsequent operation of the attachment under the meter control will cause an idle movement of the gear 14 until the pin 19 thereon again contacts with the pin 20 on the clutch disk 17. Therefore, the apparent additional cost which the consumer has made in the rendition of any bill is returned to him in current on the next bill, for which current the printing mechanism is not operated to indicate a charge. As the initial printing wheels indicate a unit for each numeral, the charge for which is very small even at normal cost, the actual additional charge by the stepping up operation is very slight, but even at this this slight additional cost is returned to the consumer in current on the next bill in the initial operation for which he is not charged. To this extent, therefore, the apparatus is extremely accurate in its relation of charge costs and unit consumption.

The step by step operation is illustrated more particularly in Figure 4, and includes a shaft 74 mounted in the partitions 2 and 6 of the attachment casing carrying a pawl 75 radially disposed with respect to the pawl disk 21 on each initial tabulating wheel of the various sets, the pawl 75 under the rocking movement of the shaft 74 engaging in the teeth of this pawl disk 21 and so serving to move the initial printing wheel in the proper direction a sufficient distance to arrange a numeral on that wheel in the printing line. The movement of the shaft 74 and thereby of the pawls 75 and the formation of the teeth on the pawl disk 21 are such that in this operation the initial printing wheel is advanced.

Basing the electric consumption of the average household consumer at sixty kilowatt hours per month and using the power approximately two hours per day, then it would take one kilowatt hour one hour to register per unit, that is, six minutes to register $\frac{1}{10}$ of a kilowatt hour for which the tabulator is adjusted. This would be ample time for printing when the first wheel is set or carried ahead one full numeral, but if the pawl happens to just miss the ratchet tooth, then owing to its length it would still carry the printing wheels ahead a distance representing at least one full minute, this in itself being sufficient to complete operating. Furthermore, before the clutch could move into position so as to miss registering $\frac{1}{10}$ of a kilowatt, it would have to be carried almost $\frac{1}{20}$ of a revolution or $\frac{1}{20}$ of a kilowatt hour. This movement representing three minutes, then the shortest time that would be allowed for operation of the machine would be approximately four minutes, which is more than sufficient. If clutch disks move into such a position as not to mesh directly in line with printing wheel clutch, the result would be that the printing wheel would be rotated the corresponding amount forward, the gear driven clutch not being able to reverse.

If at the particular moment that the control mechanism is set in operation the initial printing wheel is in such position that a numeral thereon is very close to the printing line without having reached it, the pawl will operate this printing wheel to carry it past that numeral and to the next numeral. This operation of the pawl is an important one, for in addition to moving the initial wheel of the printing set so that a numeral thereon is in the printing line, it steps up this printing wheel to free it from the influence of the operating gear 14 for an appreciable period, during which, notwithstanding the continued operation of the gear 14, there will be no corresponding movement of the printing wheels. This period of inaction of the printing wheels is necessary to permit the control mechanism, including the printing and resetting of the parts, to take place. Thus the pawl insures a proper registry of the printing wheel and also provides an interval of rest during which the control mechanism is in operation.

As previously stated, the attachment is designed to print a record at predetermined periods in the form of a bill, and in carrying out this detail of the invention it is to be understood that the record is duplicated, that is, two bills are printed, one of which is delivered outside the attachment to be taken by the consumer as the evidence of his debt to the corporation, and the other of which is delivered within the attachment to be withdrawn by the agent of the corporation as their record of the amount due from the particular consumer.

These bills are preferably in the form of elongated cards, such cards, as 76, being appropriately divided and marked so that when printed from the printing wheels they will be complete as a bill. These cards are supported longitudinally of the machine, there being provided at each end of the machine a rack 77 formed by vertical partitions 78, the respective ends of the cards being arranged in the successive spaces and between partitions in the rack. Thus the cards are supported above the attachment in successive order and the racks are operated to permit the cards to drop successively into printing position.

The racks are supported on plates 79 carrying guiding projections 80 slidably fitting guides 81 secured to the wall of the casing 1. The plates 79 depend below the racks proper and their lower edges are formed with a series of teeth 82 designed to be engaged by a dog operated by the control mechanism and advanced through a step by step movement to correspondingly advance the rack a distance equal to the thickness of a particular card in each operation. Underlying the racks is a plate 83, the forward edge of which terminates in the line at which the card is to be deposited for printing. Obviously, as the racks are advanced, the foremost card riding off the edge of the plate 83 is permitted to fall by gravity into the printing position, and by this means the cards are successively deposited for printing. Of course, the racks are formed to receive a comparatively large number of cards, that is to say, twenty-four cards constituting a year's provision of two bills rendered monthly may be readily provided for so that the card racks need to be recharged but once a year, though they can be readily devised to accommodate a larger number of cards if desired.

The side walls of the attachment casing 1 are provided with guides 84 in which are slidable blocks 85 connected by a shaft 86 carrying a presser block 87. The presser block is arranged in horizontal alignment with the printing line of the printing wheels and is designed in the operation of the shaft 86 through the sliding movement of the blocks 85 to force the card which has been deposited in printing position against an inked tape or ribbon 88 and force the latter into contact with the numerals on the printing wheels to reproduce said numerals on the card. The guides 84 and blocks 85 are arranged at the respective ends of the machine, while the shaft 86 and presser block and also the inked ribbon extend throughout the length of the machine in front of the printing wheels. The mounting of the ribbon may be in any desired manner, no particular importance being attached thereto except, of course, that the ribbon must be readily renewable and must be of such an area as to insure printing of all matter to be reproduced on the card.

A material part of the present improvement resides in the control mechanism through which the several operations hereinbefore referred to may be periodically carried out. This control mechanism is designed to actuate in proper sequence the step-by-step operation of the initial printing wheels of the respective sets, the disconnection of the transfer wheels between the respective printing wheels of a set, the delivery of the two cards from the racks to a printing position in succession, the printing of such cards, the delivery of the cards, one beyond the casing for the consumer and the other within the casing for the corporation, the disconnection of the printing wheels from their driving mechanism, the resetting of the printing wheels, the release of the clutch arm to restore the recording of the machine to the normal or higher rate, the release of the changed rate control gear provided it has not reached an operative position, and the provision of a stop for limiting the resetting of all printing wheels to the initial or zero position.

The control mechanism is actuated by a small motor and the closing of the circuit for this motor is designed for remote control or local control. That is to say, at a selected period the actuating motor for the control mechanism of all attachments located within a certain area may be energized by a single circuit closer at the office of the corporation so that any selected number of meters may automatically render their bills without further attention. Local control of each motor, however, is desirable in order that if the service is to be discontinued between the ordinary periods of bill rendition or for any other reason it is desired to take and record the reading of the meter between periods, an employe of the corporation may, through the use of a switch key, actuate the motor of a particular attachment. Therefore, under ordinary circumstances all meters may be operated at one time to render their bills or the recorded reading of any particular meter may be taken at any time to meet the particular circumstances. Thus, the government of the control means will take care of any possible contingency.

The control mechanism involves control units which, except in certain particulars, are duplicated at each end of the main operating shaft 2 though, of course, free of any direct connection with that shaft. Each unit includes a gear 89 meshing through an intermediate gear 90 with a gear 91 on a shaft 92 which extends longitudinally of the attachment, thus establishing driving communications between the respective control units and insuring simultaneous operation of both units through the motor action of one, this shaft 92 also carrying cam 73x for the operation of trip arm 73, as previously noted and as more particularly shown in Figure 14. Shaft 92 has an additional function, in that on the shaft adjacent each gear 91 is a cam disk 93 with which the ends of a floating shaft 94 engage. The shaft 94 carries clutch arms 95 designed to control the clutch disks 17 and 17' for the gross cost and net cost printing wheels respectively. As the cams for the cam disks 93 are reversely disposed with respect to their cam surfaces, it is apparent that the shaft will be operated positively in the rotation of the cam disks, and as such disks are formed to compel a reciprocating movement of the floating shaft in each revolution of the shaft 92, it is apparent that during this single revolution the clutch connection of the initial printing wheels of the cost wheels will be opened and closed. This operation is timed so as to permit an opening of the clutch immediately preceding a resetting operation of the printing wheels and a closing of the clutch to allow the meter mechanism to regain control.

The left hand control unit includes a disk 96 having a cam slot 97 therein. One terminal of an arm 98 is seated in the cam slot 97, the arm being fixed upon the shaft 26 so that in the rotation of the control units the shaft 26 is rocked, moving the pinions 27 out of cooperation with the transfer gears 23 of the printing wheels. This shaft 26 carries stop arms 99 which, in the described movement of the shaft, are turned into position in the path of a lateral pin or stop 100 on each tabulator wheel in order to limit the resetting movement of the wheels to a predetermined zero position.

The left hand side control unit carries a mutilated gear 104 adapted, following a predetermined movement of the control unit, to actuate pinions 105 and gearing 106, such gearing including a gear on the main operating shaft 2. The operation of the mutilated gear and the arrangement of the pinions and gearing 105 and 106 is such that the main operating shaft is in this operation moved reversely, thus merely through the frictional cooperation of the printing wheels therewith causing said wheels to be reversed from their normal operation and reset to the limit permitted by the cooperation of the pawls 99 and stops 100, in which limit position the printing wheels have their zero indications in the printing line.

As will be later explained, the control units are limited to a single complete rotation, but in order to insure that all printing wheels are returned to normal positions with certainty, the relation of the pinions and gearing 105 and 106 is such that under a single rotation of the control units, the main tabulating shaft is given at least four complete revolutions. This insures that under all circumstances all printing wheels, that is, the net cost wheels, the gross cost wheels, and the totalizer wheels are returned to normal position.

Prior to the printing operation, as has been previously described, the pawls 75 are operated to move the initial printing wheel to not only insure that one of the numerals of the said wheel shall be in the printing line but to prevent a further printing operation under the action of the meter until the various operations of the control units have been carried out. The shaft 74 of the step-up pawl is terminally provided at each end with an arm 107 connected by a link 108 to a lever 109 pivoted on an appropriate partition, the free end of the lever overlying the edge of a cam disk 110 of the control units. In the operation of this unit, the lever is rocked by displacement of the free end thereof, with the result of rocking the shaft 74 and thereby causing the pawls 75 to engage in the adjacent tooth of the pawl disk 21 of the initial printing wheel of the respective sets and advance the wheel a sufficient distance to insure that one of the numerals of the wheel is in printing line and the wheel has been sufficiently advanced to prevent further indication by the meter until the actuation of the control units has been completed.

The cam 110x is arranged to operate levers 111 and links 112 to thereby actuate the shaft 86 to advance the presser blocks for the printing operation, this movement, of course, being timed to follow the step-up movement of the printing wheels just described. The levers 111 are connected by links 113 extending opposite the links 112 to a lever 114 loosely supported on the main operating shaft, with the upper end formed as a dog 115 to cooperate with the teeth 82 and in the swinging movement of the lever 114 advance the card racks to a position to free the initial card from the edge of the plate 83 and permit the card to drop to printing position. The lower edge of the card, when in printing position, is supported by two angularly related bars 116 and 117. These bars are pivoted intermediate their ends on oppositely extending arms 118 and 119 of a lever 120 pivotally supported on the adjacent partition, with its upper or free end depending in the path of a cam disk 121 forming part of the control unit.

The bars 116 and 117 below their pivotal supports are preferably tapered to define a point at their meeting ends, and in the normal position of the parts these arms are held in contact at their meeting ends by springs 122. The bars 116 and 117 thus define a V-shaped space to receive the lower edge of the card 76 and support it during the printing operation. In line with the upper ends of the bars 116 and 117 there is secured upon the appropriate partition of the casing stops 123 and 124, the former cooperating with the bar 116 and the latter cooperating with the bar 117. Below the meeting ends of the bars 116 and 117 is a guide plate 125, the upper end of which is of V-formation presenting a relatively short, rearwardly inclined section 126 and a comparatively long, forwardly inclined section 127. The forwardly inclined section 127 terminates in a flange 128 and the rearwardly inclined section overlies a shelf 129 in the interior of the attachment.

In the operation of the device immediately following the printing operation, the cam disk 121 engages the upper end of the lever 120 and moves the same toward the right as the parts are arranged in Figure 5. This rocks the lower end toward the left, and by reason of the cooperation of the bar 116 with its stop 123, the bar is rocked on its pivotal connection with the lever, the bar 117 maintaining its normal position. This rocking of the bar 116 opens the card-holding apex formed by the meeting ends of the bars and the card is permitted to drop therethrough. As the bar 117 maintains its normal position, the card is directed by said bar onto the guide section 127 so that the card falls onto the flange 128, from which it is accessible from the exterior of the casing by the consumer.

The immediately succeeding printing operation, it having been previously stated that two cards are printed in immediate succession in the single rotation of the unit control, having taken place, the cam disk 121 rocks the lever 120 in the opposite direction. This shifts the card bar 117 without affecting the position of the card bar 116 and the second printed card is released and deflected over the rear section 126 of the guide and onto the shelf 129, that is, wholly within the interior of the attachment, from which the cards may from time to time be taken by an employe of the service corporation in order to check up with the cards presented by the consumer in payment.

Thus at each operation of the control unit two cards are printed, one of which is delivered to the consumer and the other of which is delivered to the interior of the machine beyond the reach of the consumer to provide a permanent record for the use of the service corporation. Of course, the pawl or dog for advancing the card rack and the cam mechanism for controlling the printing operation is actuated properly to compel the delivery of two cards to insure two printing operations of the presser block, the remaining parts of the mechanism being held in fixed position without change in order that the data printed on the respective cards will be the same.

As previously described, the changed rate clutch arm 49 is locked in changed rate position by the locking lever 70, and it is apparent that the mechanism must be returned to normal cost conditions during the initial actuation of such mechanism in the next operating period of the attachment. In order to provide for this operation, the shaft 92 is provided with a cam disk 130 arranged in the path of the free end of the locking lever 70 so that as the shaft 92 is operated this cam disk 130 will engage and depress the free end of the locking lever and thus raise the locking terminal 71 of such locking arm from behind the clutch arm 49 and permit the clutch arm to return to normal position to operate the shaft 42 at normal cost speed. Thus the mechanism is automatically reset both as to the positions of the printing wheels and as to the speed with which said printing wheels are initially operated for normal cost indication in the appropriate operation of the control units so that during the initial operation for the succeeding period the attachment is working on a normal cost basis and the changed rate mechanism is not operated until following the full consumption of units at normal cost as determined by the rules of the service corporation.

The attachment is designed particularly for completely automatic service to effect a saving in the rendering of bills and in the necessity for the employe reading the individual meter for each period for which the bill is to be rendered. In adapting the attachment for the rendering of bills, it is, of course, obvious that it is only necessary to actuate the control units. This actuation is contemplated through an actuating means forming part of each attachment and preferably embodies a small motor 131 acting through intermediate gearing to operate a disk 132 having an offset lug 133 on one face near the periphery. A second disk 134 is rotatably supported in a plate 135 carried by one of the side walls of the attachment, the disk 134 being coupled to the control unit shaft 136 so that in the operation of the disk the control units are actuated. The disk 134 is designed for a single revolution and to insure such limit of movement the disk 134 is provided with a spring-pressed pin 137 designed to normally bear against or run in a groove in the plate 135, and when bearing on the surface of the plate provide a projection in the path of the lug 133 so that the motor may operate the disk 134. The plate 135 is formed with an opening 138 to receive the pin 137 so that when the disk 134 has completed a single revolution, the pin 137 is snapped into the opening 138, removing the pin from the path of the lug 133 and interrupting further movement of the disk 134, notwithstanding the continued operation of the motor.

In order to cause the motor to selectively operate the disk 134 when desired, the pin 137 must be restored to normal position, that is, projected beyond the face of the disk 134 in the path of the lug 133. To insure this operation, an arm 139 is pivotally supported on a depending portion of the plate 135 and provided at its upper end with a pin 140 normally aligned with the opening 138. The arm 139 is spring-pressed by a spring 141 to keep the pin 140 free of the opening 138, while said arm is positively actuated in the opposite direction to cause the pin 140 to enter the opening 138 and force the pin 137 out of the opening 138 to free the disk 134 through the medium of a solenoid 142, the core of which is connected to the arm 139 and which solenoid is energized by the motor circuit 143. The solenoid may be initially energized by the motor circuit 143 and in its energized position the core 144 of the solenoid may close a switch 145 in the motor circuit so that the solenoid is initially energized to displace the pin 137, following which the motor is energized to drive the disk 132 and through the lug 33 compel a single rotation of the disk 134. The limit of movement of the pin 140 is such that it serves to displace the pin 137, and it is apparent that pin 140 must remain in operative position for a short period in order that the lug 133 will have an opportunity to engage the pin 137 and so move the disk 134 so that the pin 137 is out of line with the opening 138.

To secure this momentary dwell of the pin 137 in inoperative position, the return movement of the solenoid core under the influence of the spring is retarded by a suitable dash pot 146, the operation being timed so that the pin 140 is positively removed from the opening 138 at some period intermediate a full revolution of the disk 134. Of course, the solenoid core acts to break the solenoid circuit through any conventional switch control immediately following its initial operation so that the arm 139 is free to return to normal position except as retarded by the dash pot. This circuiting condition is illustrated more particularly in Figure 1.

From the above description, it will be apparent that the printing wheel sets are responsive to meter actuation to clearly indicate the various details of total units consumed for the billing period, gross cost of such units, net cost of such units and the total units consumed for the full period of attachment use, the attachment also automatically maintaining a proper proportion between the gross cost and net cost and at the same time providing for a changed rate under those conditions where a service corporation permits all units after the use of a prescribed number to be sold at a less rate than the initial cost. Of course, the attachment includes a step-up at each period for the dating wheel to arrange a new date and also includes a block, indicated at 147, which bears a serial number which is merely printed on each card to identify the particular card or bill with the particular meter.

Of course, in the stepping up of the initial tabulating wheels, such wheels are advanced beyond the operative position of the driving gears which are being influenced by the meter operation so that there is an appreciable period of time in which the meter may continue to operate without effecting an actuation of the tabulating wheels and during this time the control mechanism has effected its several operations. Thus the operation of the meter is not at all interrupted and the registration on the initial printing wheels incident to the step-up movement is compensated for by the immediately following use of the current, that is, actuation of the meter without registration until the meter operated gears again catch up with the gear 15, that is, until the pin 19 reaches and again contacts with the pin 20.

Of course, it is understood that the invention is designed for use with any metering device, particularly electric, gas and water meters, and that in cases where company men are required to operate machines or meters to produce a bill each month instead of using automatic control from a power station, then two bills will be delivered to the customer or operator by a simple change of cams controlling delivery of bills.

We claim:—

1. A recording attachment for meters including type wheels, drive means, first means responsive to the drive means for actuating the type wheels at a first predetermined rate, impression means, a second means for actuating the type wheels from the drive means at a second predetermined rate, coupling means for selectively coupling either of said type wheel actuating means with the type wheels, means actuated by the drive means and operative following a predetermined operation of the type wheels to cause the coupling means to couple one of said actuating means to the type wheels, locking means for holding the coupling means in a predetermined coupling relation, a unit control, and means responsive to said unit control for releasing the locking means and operating said impression means.

2. A recording attachment for meters including type wheels, drive means, first means responsive to the drive means for actuating the type wheels at a first predetermined rate, impression means, a second means for actuating the type wheels from the drive means at a second predetermined rate, a clutch for selectively coupling either of said type wheel actuating means with the type wheels, means actuated by the drive means and operative following a predetermined operation of the type wheels to cause the clutch to be shifted from one to the other of said actuating means, means for holding the clutch in shifted position, a unit control, and means responsive to said unit control for releasing said clutch holding means and operating said impression means.

3. A recording attachment for meters including type wheels, drive means, first means responsive to the drive means for actuating the type wheels at a first predetermined rate, impression means, a second means for actuating the type wheels from the drive means at a second predetermined rate, a clutch for selectively coupling either of said type wheel actuating means with the type wheels, means actuated by the drive means and operative following a predetermined operation of the type wheels at the first predetermined rate to cause the clutch to be shifted for operating the type wheels at the second predetermined rate, means for holding the clutch in shifted position, a unit control, and means responsive to said unit control for operating said clutch holding means to release the clutch and for operating the impression means.

4. A recording attachment for meters including type wheels, drive means, first means responsive to the drive means for actuating the type wheels at a first predetermined rate, impression means, a second means for actuating the type wheels from the drive means at a second predetermined rate, a clutch for selectively coupling either of said type wheel actuating means with the type wheels, means actuated by the drive means and operative following a predetermined operation of the type wheels to cause the clutch to be shifted from one to the other of said actuating means, a lever for holding the clutch in shifted position, a unit control, and means responsive to the unit control for operating the impression means and actuating the clutch holding lever to release position.

5. A recording attachment for meters including type wheels, drive means, first means responsive to said drive means for actuating the type wheels at a first predetermined rate, impression means, a second means for actuating the type wheels from the drive means at a second predetermined rate, a clutch for selectively coupling either of said type wheel actuating means with the type wheels, a clutch shifting lever, means actuated by the drive means and operative following a predetermined operation of the type wheels to actuate the clutch shifting lever to shift the clutch from one to the other of said actuating means, means for holding the clutch shifting lever in clutch shifted position, a unit control, and means responsive to the unit control for actuating the impression means and for releasing the clutch shifting lever holding means.

6. A recording attachment for meters including type wheels, a drive means therefor, gearing actuated by the drive means for operating the gear wheels at a first predetermined rate, a second set of gear wheels actuated by the drive means for operating the type wheels at a second predetermined rate, a clutch for causing either set of gearing to operate the type wheels, a lever for operating the clutch, said clutch in normal position coupling one set of gearing to the type wheels, means operative following a predetermined actuation of the drive means to shift the lever for clutching the other set of gearing into driving cooperation with the type wheels, means for locking the lever in the latter position, said lever shifting means including a solenoid having a core for actuating the lever, a normally open circuit including the solenoid, and a circuit closing means operated by the drive means.

7. A recording attachment for meters including type wheels, a drive means therefor, gearing actuated by the drive means for operating the gear wheels at a first predetermined rate, a second set of gear wheels actuated by the drive means for operating the type wheels at a second predetermined rate, a clutch for causing either set of gearing to operate the type wheels, a lever for operating the clutch, said clutch in normal position coupling one set of gearing to the type wheels, means operative following a predetermined actuation of the drive means to shift the lever for clutching the other set of gearing into driving cooperation with the type wheels, means for locking the lever in the latter position, said lever shifting means including a solenoid having a core for actuating the lever, a normally open circuit including the solenoid, and a circuit closing means operated by the drive means, said circuit closing means including a gear driven by the drive means and a circuit closing element carried by the gear.

8. A recording attachment for meters including type wheels, a drive means therefor, gearing actuated by the drive means for operating the gear wheels at a first predetermined rate, a second set of gear wheels actuated by the drive means for operating the type wheels at a second predetermined rate, a clutch for coupling either set of gearing to the type wheels, a lever for operating the clutch, said clutch in normal position coupling one set of gearing to the type wheels, means following a predetermined actuation of the drive means to cause the lever to shift for clutching the other set of gearing into driving cooperation with the type wheels, means for locking the lever in the latter position, said lever shifting means including a solenoid having a core for actuating the lever, a normally open circuit including the solenoid, and a circuit closing means operated by the drive means, said circuit closing means including a gear driven by the drive means and a circuit closing element carried by the gear, and means operated by the solenoid for disconnecting the circuit closing element carrying gear from the drive means.

HARRY CLIFTON.
FREDERICK W. WHITEHEAD.